Oct. 20, 1942.   S. M. HUMPHREY   2,299,543
APPARATUS FOR CORRELATING WELDING PRESSURES AND CURRENTS
Filed Sept. 20, 1940   2 Sheets-Sheet 1

Inventor
STANLEY M. HUMPHREY
By Francis J. Klempay
Attorney

Patented Oct. 20, 1942

2,299,543

UNITED STATES PATENT OFFICE 2,299,543

APPARATUS FOR CORRELATING WELDING PRESSURES AND CURRENTS

Stanley M. Humphrey, Warren, Ohio, assignor to Taylor-Winfield Corporation, Warren, Ohio, a corporation of Ohio Application September 20, 1940, Serial No. 357,561

11 Claims. (Cl. 219—4)

This invention relates to a welding apparatus and more particularly to an improved arrangement for correlating the pressure and relative movement between the electrodes and the current applied to the electrodes. In the welding of certain metals, particularly aluminum, and of various alloys particular attention must be given to the natures of the pressure cycle and the current cycle and their correlation during the welding operation to produce satisfactory welds. It is ordinarily desirable in welding the softer metals to apply substantial pressure between the electrodes before the application of the current and to reduce this initial pressure to one-half or more during the application of the welding current and to bring the pressure back to substantially its initial value upon the cessation of the flow of the current.

Likewise, the nature of the cycle of the welding current should be predetermined and controlled and in the welding of the softer metals it is desirable to begin with little or no current during the initial application of high pressure, rapidly raising current value to its predetermined maximum, maintaining the maximum current during the low pressure interval, and reducing the current value before the reapplication of the higher welding pressure. These pressure and current cycles and their correlation as generally prescribed will produce satisfactory welds in most instances, although experience and tests have shown that other pressure and current curves are required in certain applications. For example, it may be desired to maintain the low pressure and even to reduce the pressure somewhat a considerable interval after the cessation of the flow of current and then to rapidly bring the pressure to a predetermined maximum and maintain the same during a fixed interval of time to complete the weld. However, in most applications, the current and pressure cycles first described are satisfactory and the only variables required will be in the values of the pressure and current. In other words, the shapes and correlation of the pressure and current curves will remain fixed but the values thereof will be varied.

The primary object of the invention is the provision of improved apparatus whereby the nature of the cycles of the welding pressure and current, as applied between the electrodes of the welding machine, may be readily varied and the correlation effected, whereby such adjustments may be readily accomplished by relatively simple means.

A more specific object of the invention is the provision in a welding machine of apparatus to vary the value of the pressures imposed on the movable electrode while maintaining substantially constant the nature of the pressure cycle.

A further object of the invention is the provision in a welding apparatus having readily operable means to vary the nature and value of the pressure cycle applied to the electrode of improved means to transmit the pressure to the movable electrode whereby the dynamic characteristic of said movable electrode is substantially improved.

These and other objects and advantages of the invention will become apparent from a consideration of the drawings and the following detailed specification wherein there is specifically disclosed a preferred embodiment of the invention.

Figure 1:
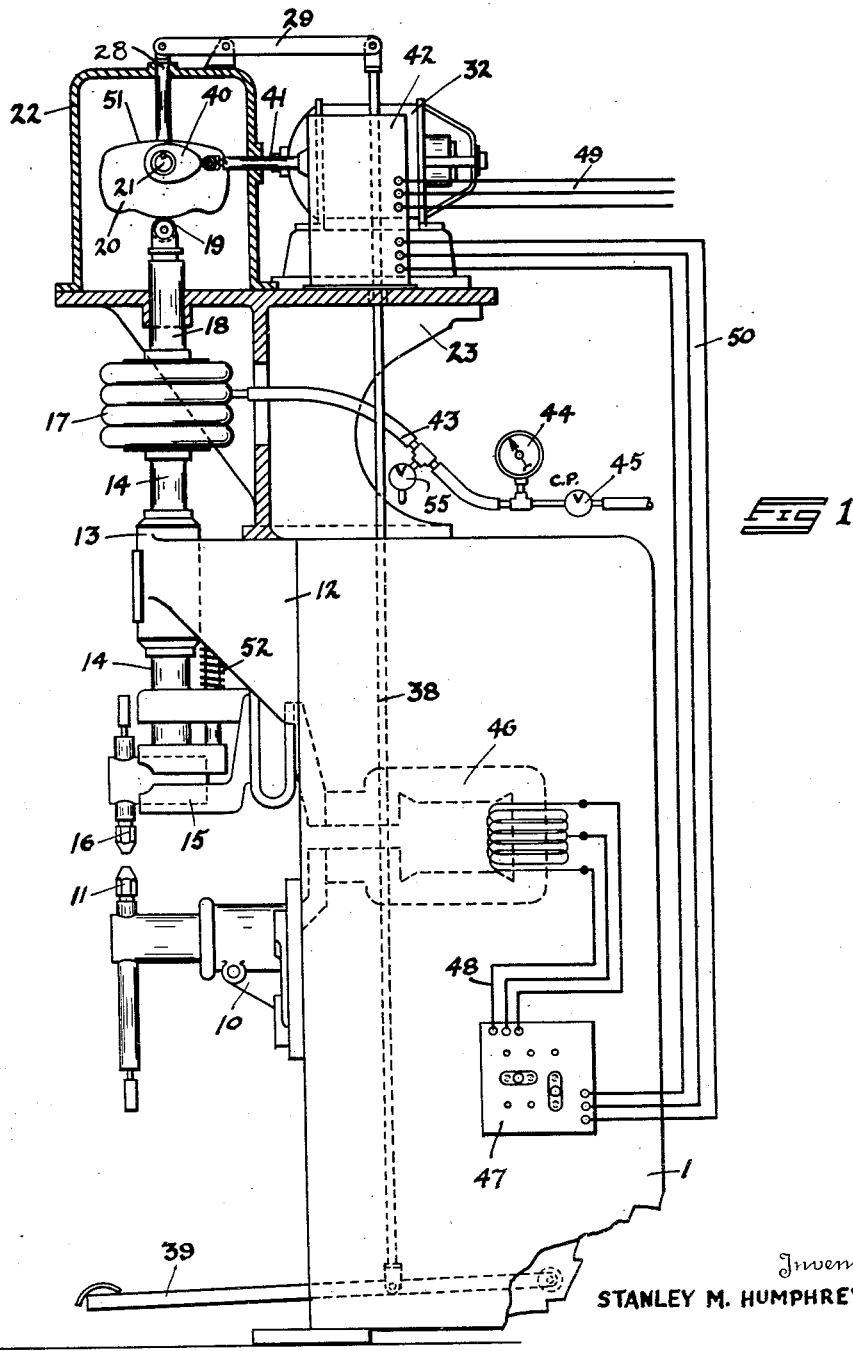
Figure 1 is a side view of a welding machine constructed in accordance with the principles of the present invention.

Referring to the drawings, the illustrated preferred embodiment of the invention consists of a welding machine having a base 1, a vertically adjusted bracket 10 secured thereto, a normally fixed electrode 11 carried by the bracket 10, and a movable electrode 16 supported and operated by the improved instrumentalities to be hereinafter specifically described. A bracket 12, having an outer vertically bored portion 13, is also carried by the base 1 and a rod 14, carrying at its lower end an electrode holder 15, is slidably received within the bore in the bracket portion 13. Electrode 16 is carried by the member 15.

To the upper end of the rod 14 is attached to one end of a bellows 17 and extending upwardly from the other end of the bellows is a rod 18 rotatably supporting at its upper end a cam following roller 19. Roller 19 follows cam 20 which is keyed to a shaft 21 journaled within the casing 22. Although any suitable means may be employed to rotate shaft 21 and consequently cam 20, I have chosen for illustration purposes a single revolution clutch driven by a motor 32 for accomplishing this purpose. By referring to Figure 2, which illustrates a conventional form of the single revolution mechanism, it can be seen that the shaft 21 is provided with a projection rotatably received within a bore in a spline gear 30. The gear 30 is keyed with a worm wheel 31 which is normally continuously driven by the motor 32. A spline gear 24, having a hub portion 25 on which is mounted a cam and stop 26, is feathered on the shaft 21 and is normally urged into engagement with the gear 30 by means of the coil spring 27. A pin 28 extends down through the upper wall of the casing 22 and, when in lower position, engages cam 26 and maintains gears 24 and 30 out of engagement. Pin 28 is adapted to be moved vertically by lever 29 which is coupled by means of a rod 38 with a foot treadle 39. Assuming the gear 30 to be rotating, retraction of the pin 28 allows spring 27 to move gear 24 into engagement with gear 30, thereby effecting rotation of the shaft 21. If pin 28 is allowed to move to its lower position immediately upon interengagement of the gears, as the cam 26 comes around it will engage the lower portion of the pin 28 and withdraw the gear 24 from the gear 30. The parts are so arranged that the gear 24 and consequently the shaft 21 make one complete revolution each time the pin 28 is raised and lowered.

Figure 2:
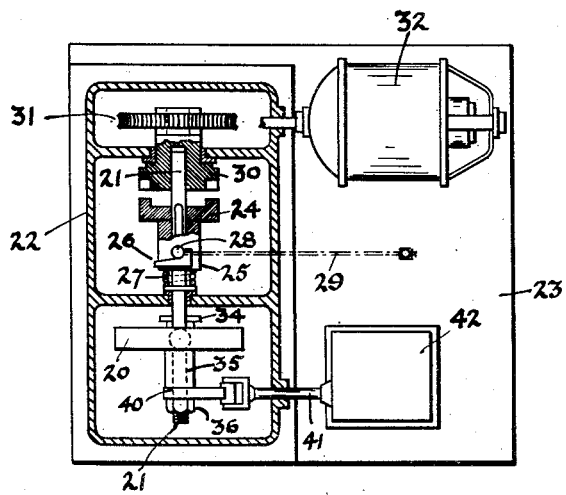
Figure 2 is a top view partly in section of a portion of the machine of Figure 1.

Also mounted on the shaft 21 outwardly of the cam 20 is a second cam 40 operatively connected by means of the follower 41 with a timer 42. As shown in Figure 2, a nut 36 screwed onto the shaft 21 provides for the ready removal and replacement of the cams 20 and 40. A ring or shoulder 34 may be provided on the shaft 21 against which the cam 20 is adapted to abut and the spacer 35 may be provided between the cams 20 and 40.

Fluid pressure from a suitable source is supplied to the interior of the bellows 17 through a conduit 43 having interposed therein a pressure indicator 44 and an adjustable constant pressure valve or regulator 45.

In accordance with usual practice a welding transformer 46 and a voltage regulator 47 are positioned in the base 1 and conductors 48 interconnect the primary of the transformer with the regulator. Current is supplied to the timer 42 through the conductors 49 and the timer 42 and the regulator 47 are interconnected by means of the conductors 50.

Figure 3:
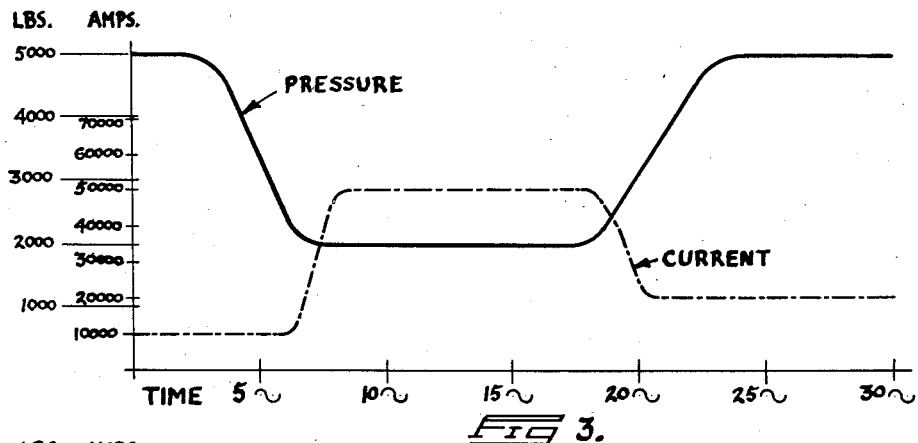
Figures 3 and 4 are charts illustrating representative pressure and current cycles and their correlation during the welding operations.
Figure 4:
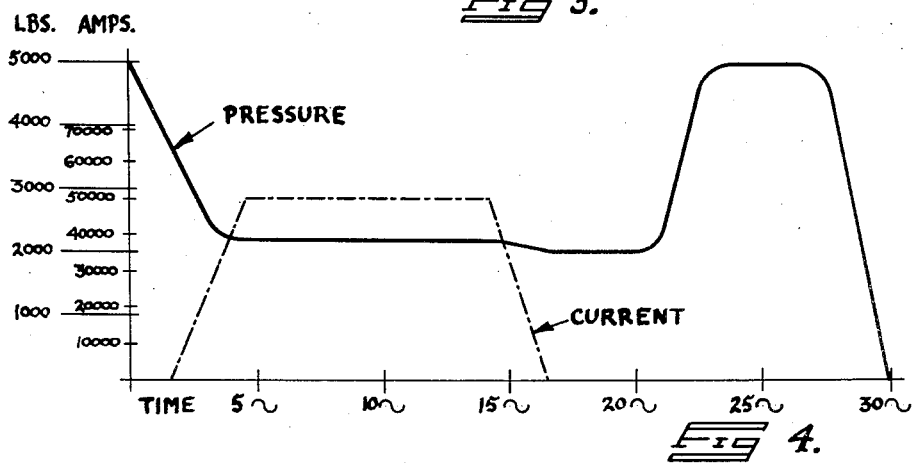

Figure 1 illustrates the position of the parts during the flow of the current during the welding cycle and the cams 20 and 40, as shown, give the resultant pressure and current curves illustrated in Figure 3. The pressure exerted during the application of the welding current is determined by the radius of that portion of the cam 20 which engages the follower 19 and by the fluid pressure supplied to the bellows 17. An increase in the fluid pressure supplied to the bellows will correspondingly increase the pressure exerted by the movable electrode 16 on the work positioned between the electrodes 11 and 16 and, likewise, when the high point of the cam again reaches follower 19 an increase in the fluid pressure will result in a higher final pressure exerted between the electrodes. Thus, it is possible, simply by adjusting the regulator 45, to vary the values of the pressures produced throughout the cycle while not disturbing the shape of the pressure-time curve. By the employment of variously shaped cams 20 various pressure-time curves can be obtained, if desired. Figure 4 shows a pressure cycle which is attained by the use of a cam differently shaped from the cam shown in Figure 1.

Timer 42, being operated by the follower 41 engaging cam 40, is operative to transmit a predetermined quantity of energy to the transformer in correlation with the pressure cycle inasmuch as the cam 40 is keyed to the same shaft as is the pressure cam 20. Motor 32 may be of the synchronous type and driven from the line 49 and it is therefore possible, by constructing the cam 40 in the proper manner, to insure the starting of the flow of current to the transformer 46 at the same point of a cycle of the alternating current and to maintain the circuit closed during a predetermined number of cycles. Timer 42 may also be of the electrical type which is operative to permit the flow of welding current for a predetermined number of cycles after initiating movement by the cam 40.

In the operation of the apparatus above described between welding operations the dwell 51 of the cam 20 is opposite the follower 19 and the spring 52 is operative to maintain the electrodes in spaced relation. The desired pressure is built up in the bellows 17 by adjustment of the regulator 45 and the release of pressure from within the bellows 17 through valve 55, if the pressure within the bellows is already above that desired. As the pin 28 is momentarily withdrawn to initiate operation of the welding cycle, the shaft 21 carrying cams 20 and 40, will travel through one revolution, as explained above, and in doing so will move the rod 18 in accordance with the working face of the cam 20 to collapse the bellows 17, varying the pressures therein, and this, being transmitted to the movable electrode, will vary the pressure exerted by the electrode. It should be observed, however, that the welding pressure as applied to the electrode at all times comes from the bellows 17, which, being without any starting friction and having substantially little inertia, will cause the movable electrode to follow through immediately upon softening of the metal, thereby effecting improved quality of the welds and enabling the same to be effected with a minimum of welding current.

It should now be apparent that I have provided an improved apparatus for applying welding pressure and timing the flow of welding current to the electrodes of a welding machine and for correlating the pressure and current cycles which satisfactorily accomplishes the objects initially set out. By the use of the apparatus of the present invention it is possible to readily vary the pressures applied to the electrode during the welding cycle over a considerable range of movement of the movable electrode without interferring with the general pressure-time relation of the welding cycle and whole enabling desirable dynamic characteristics of the electrode moving means to be maintained.

The above specifically described object of the invention should be considered as illustrative only as obviously many changes may be made therein without departing from the spirit or scope of the invention.

What I claim is:

1. In a welding machine, the combination of a fixed electrode, a movable electrode, a fluid pressure filled bellows coupled at one end with said movable electrode and operative to apply welding pressure thereto, means to move the opposite end of asid bellows towards and away from said fixed electrode, said means including a motor driven cam, and means to maintain a constant fluid pressure in said bellows between successive welding operations.

2. Welding apparatus comprising in combination a normally fixed electrode, a movable electrode, means to move and apply welding pressure through said movable electrode comprising a fluid pressure filled collapsible member having one of it's ends coupled with said movable electrode, a source of alternating current for said apparatus, means operating in synchronism with said source of current to move the other end of said member toward and away from said fixed electrode, and means to control the fluid pressure maintained in said member between successive welding operations.

3. A welding machine comprising in combination a normally fixed electrode, a movable electrode, means to move and apply welding pressures through said movable electrode comprising a fluid pressure filled collapsible member operatively coupled at its one end with said movable electrode; means to move the other end of said member relative to said fixed electrode comprising a shaft, a cam keyed on said shaft, a motor, and a single revolution clutch interconnecting said motor and shaft; and means to adjust the fluid pressure existing in said member between successive welding operations.

4. Welding apparatus comprising in combination a normally fixed electrode, a movable electrode means to move and apply welding pressure through said movable electrode comprising a fluid pressure filled collapsible member having one of its ends coupled with said movable electrode, a source of alternating current for said apparatus, means operating in synchronism with said source of current to move the other end of said member toward and away from said fixed electrode, means to control the fluid pressure maintained in said member at the beginning of each welding operation, and means controlled in accordance with the operation of said means to move the said other end of said collapsible member to control the flow of welding current to said electrodes.

5. Welding apparatus comprising in combination a normally fixed electrode, a movable electrode, means to move and apply welding pressure through said movable electrode comprising a fluid pressure filled collapsible member having one of its ends coupled with said movable electrode, a source of alternating current for said apparatus, means operating in synchronism with said source of current to move the other end of said member toward and away from said fixed electrode, and means controlled in accordance with the operation of said means to move the said other end of said collapsible member to control the flow of welding current to said electrodes.

6. Welding apparatus comprising in combination a normally fixed electrode, a movable electrode; means to move said movable electrode toward and away from said fixed electrode and to apply pressure between the electrodes comprising a patterned cam, a synchronous motor to drive said cam, and a source of alternating current for said motor; a collapsible member interposed between said cam and said movable electrode whereby the pressure applied between said electrodes will follow a predetermined time-pressure relation as determined by the pattern of said cam, means to conduct welding current from said source to said electrodes, said last mentioned means including a circuit controlling device mechanically operated by said motor whereby the time of the beginning and the duration of the current impulse applied to said electrodes is controlled and correlated with respect to the pressure cycle applied thereto with the timed period of current flow beginning at a predetermined point on a cycle of the source current.

7. Welding apparatus comprising in combination a normally fixed electrode, a movable electrode; means to move said movable electrode toward and away from said fixed electrode and to apply pressure therebetween comprising a patterned cam, and a motor for actuating said cam; a fluid pressure filled collapsible member interposed between said cam and said movable electrode whereby the pressure applied between said electrodes will follow a predetermined time-pressure relation as determined by the pattern of said cam, means to maintain a predetermined fluid pressure in said member between successive welds, means to conduct welding current to said electrodes comprising a source of current, and a circuit controlling device mechanically coupled with said cam whereby the time of the beginning and the duration of the current impulse applied to said electrodes is controlled and correlated with respect to the pressure cycle applied thereto.

8. Welding apparatus comprising in combination a normally fixed electrode, a movable electrode; means to move said movable electrode toward and away from said fixed electrode and to apply pressure therebetween comprising a patterned cam, and means to actuate said cam; a fluid pressure filled collapsible member interposed between said cam and said movable electrode whereby the pressure applied between said electrodes will follow a predetermined time-pressure relation as determined by the pattern of said cam, means to maintain a predetermined fluid pressure in said member between successive welds, means to supply welding current to said electrodes comprising a current source and a timing device interposed between said source and electrodes, and means including a mechanical element coupled with said cam to initiate operation of said timing device whereby the time of the beginning and the duration of the current impulse applied to said electrodes is controlled and correlated with respect to the pressure cycle applied thereto.

9. In a welding machine, the combination of a fixed electrode, a movable electrode, a fluid pressure filled collapsible member coupled at one end with said movable electrode and operative to apply welding pressure thereto, means to move the opposite end of said member toward and away from said fixed electrode, said means including a motor driven patterned cam, means to maintain a constant fluid pressure in said member between successive welding operations, and means to maintain the quantity of fluid in said member substantially constant whereby the pressure applied between said electrodes will follow a predetermined time-pressure relation as determined by the pattern of said cam.

10. A welding machine comprising in combination a normally fixed electrode, a movable electrode, means to move and supply welding pressures through said movable electrode comprising a fluid pressure filled collapsible member operatively coupled at its one end with said movable electrode, means to move the other end of said member relative to said fixed electrode comprising a shaft, a patterned cam keyed on said shaft, a motor, a single revolution clutch interconnecting said motor and shaft, means to adjust the fluid pressure existing in said member between successive welding operations, and means to maintain the quantity of fluid in the member substantially constant during the welding cycle.

11. Welding apparatus comprising in combination a normally fixed electrode, a movable electrode; means to move said movable electrode relative to said fixed electrode and to apply pressure therebetween comprising a patterned cam, a shaft carrying said cam, a synchronous motor to drive said shaft, and a source of alternating current for said motor; a collapsible member interposed between said cam and said movable electrode whereby the pressure applied between said electrodes will follow a predetermined time-pressure relation as determined by said cam, means including a switch to conduct welding current from said source to said electrodes, a second cam on said shaft adapted to close said switch and to maintain said switch closed for a predetermined number of cycles whereby the time of the beginning and the duration of the current impulse applied to said electrodes is controlled and correlated with respect to the pressure cycle applied thereto with the timed period of current flow beginning at a predetermined point on a cycle of the source current.

STANLEY M. HUMPHREY.